Patented Aug. 19, 1924.

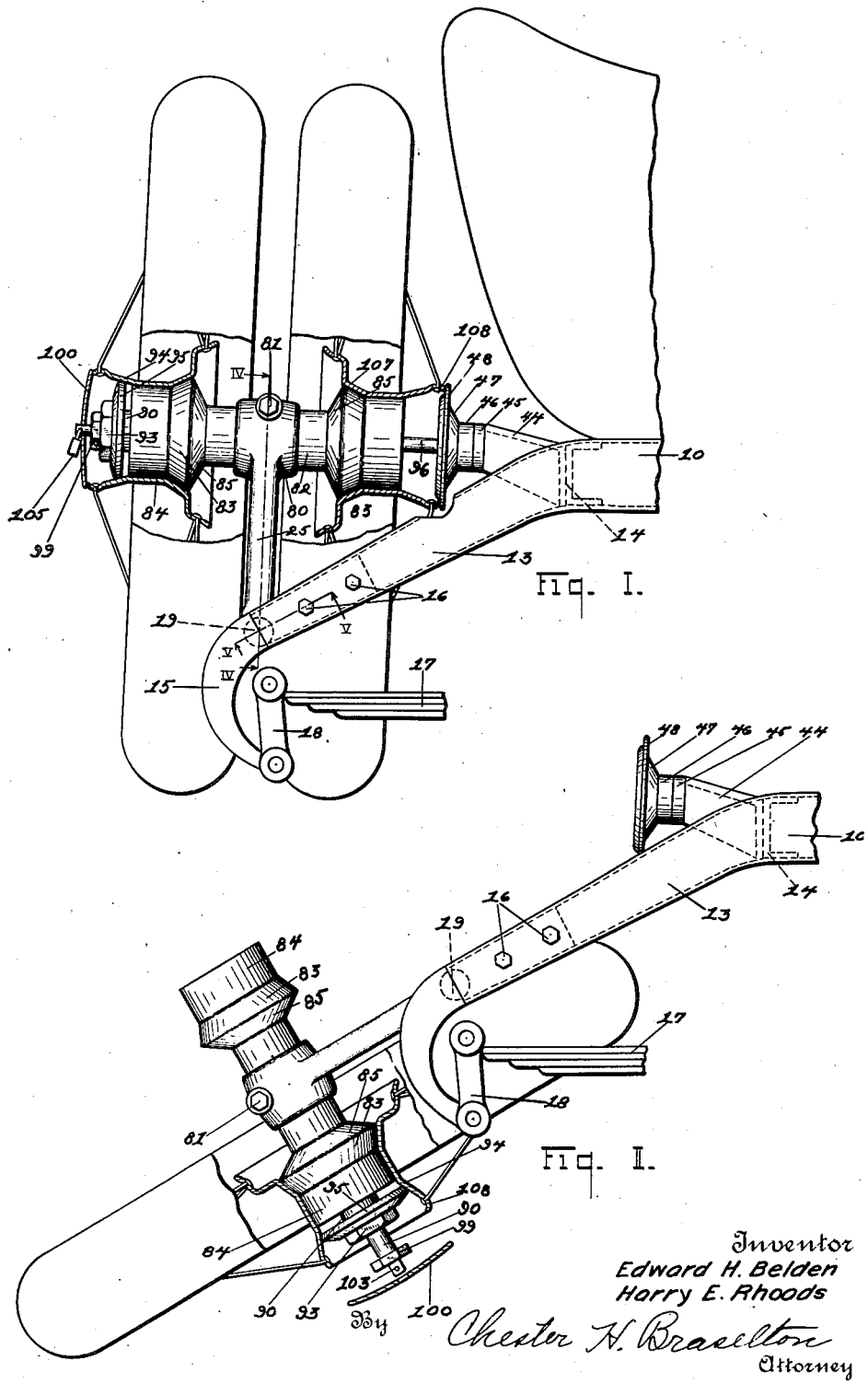

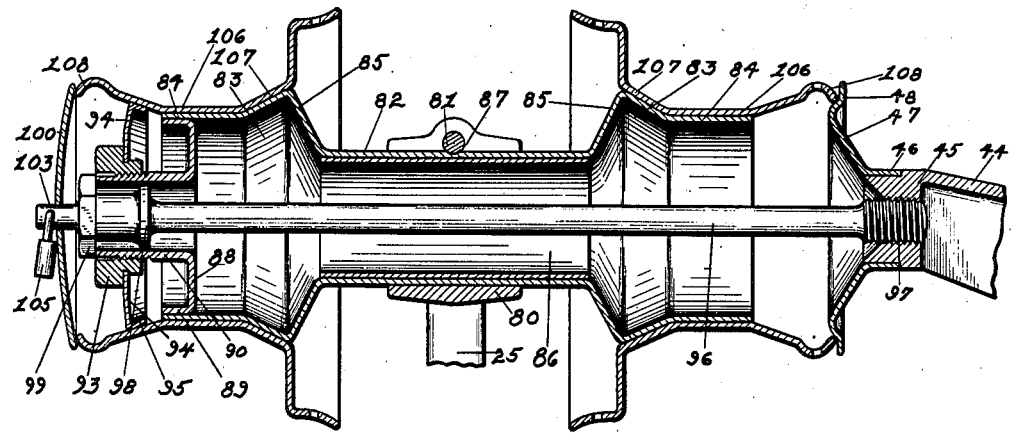

1,505,527

UNITED STATES PATENT OFFICE.

EDWARD H. BELDEN AND HARRY E. RHOADS, OF TOLEDO, OHIO, ASSIGNORS, BY MESNE ASSIGNMENTS, TO THE WILLYS-OVERLAND COMPANY, OF TOLEDO, OHIO, A CORPORATION OF OHIO.

CARRIER FOR SPARE WHEELS.

Original application filed June 4, 1917, Serial No. 172,720. Divided and this application filed July 30, 1917. Serial No. 183,497.

*To all whom it may concern:*

Be it known that we, EDWARD H. BELDEN and HARRY E. RHOADS, citizens of the United States, residing at Toledo, in the county of Lucas and State of Ohio, have invented certain new and useful Improvements in Carriers for Spare Wheels, of which we declare the following to be a full, clear, and exact description.

This invention relates to improvements in carriers for demountable wheels, and particularly to carriers of the type which are secured to the rear end of the automobile frame.

In the manufacture of automobiles, wire wheels are usually substituted for wooden wheels only on special orders and it is highly desirable that the carrier for the spare rims or wheels be so constructed that the parts thereof which are permanently attached to the chassis frame, should be the same, no matter whether rims or wheels are to be used. One of the objects of this invention is to provide a carrier capable of use in this manner, and particularly adapted to hold an extra wheel.

Further objects of this invention are to provide a carrier capable of holding a plurality of extra wheels so constructed that either of the wheels can be readily and separately removed; to provide a carrier which is so mounted that it may be swung downwardly towards the ground to facilitate the application and removal of a wheel, requiring the lifting of the wheel through a small distance only.

Further objects of this invention are to provide a carrier so constructed as to lock the wheels in place thereon, to prevent the unauthorized removal thereof; to provide a construction which is rigid and strong and one which will not rattle or work loose when applied to an automobile frame; to provide means for securely maintaining the wheels rigidly on the carrier in such a manner that the wheels likewise will not become loose or rattle during movement of the vehicle.

Further objects of this invention relate to details of construction and association of parts, as will hereinafter more fully appear from the description.

Various means can be utilized for carrying this invention into effect and it is to be understood that the means disclosed is merely shown by way of illustration, and that the particular means may be departed from and varied to a wide extent by those skilled in the art without departing from the spirit and scope of the invention, as pointed out in the appended claims.

A structure, constituting a preferred embodiment of our invention, is illustrated in the accompanying drawings, forming a part of this specification, in which:

Figure I is a fragmentary view in side elevation showing the rear end of an automobile equipped with a carrier for demountable wheels constructed in accordance with our invention.

Figure II is a view similar to Fig. I, but showing the carrier swung down towards the ground and with one of the wheels removed.

Figure III is an enlarged, sectional view, centrally through the hub of the wheel supported on our carrier.

Figure IV is a detail sectional view taken substantially on the line IV—IV of Figure I.

Figure V is a detail sectional view taken substantially on the line V—V of Figure I.

Figure VI is a detail sectional view taken substantially on the line VI—VI of Figure V.

In the drawings, similar reference numerals refer to similar parts throughout the several views, and sectional views are taken looking in the direction of the little arrows at the end of the section lines.

Considering the numbered parts of the drawings, it will be seen that we have shown our invention embodied in a construction attached to the rear end of an automobile frame, in which 10 are the side members, 14 is the rear cross bar connecting said side members, and 13 are the downwardly bent extensions from said side members 10. The downwardly and forwardly curved members 15 are secured to the ends of the extensions 13 by means of the bolts 16. The rear ends of the spring 17 are connected to the lower ends of members 15 by the links 18. A brace rod 19 is secured at its ends to said members 15, and extends between said members. The carrier is pivotally mounted upon said connecting brace rod 19, so as to swing from the position shown in Figure I to the position shown in Figure II.

A pair of collars 20, provided with flanges 23 at the edges thereof, are secured to the rod 19, at a suitably spaced interval, and the legs 25 of the carrier supporting member are provided at their lower ends with half round bearing surfaces which seat upon said collars 20 between flanges 23. A retaining block 27 is pivotally connected to the foot of each leg 25 and seats on the collar 20 between flanges 23, being releasably connected to the foot of leg 25 by the bolt 29 extending through the flanges 30 and 33 on said parts and threaded into the flange 33. This construction is shown in Figure IV of the drawing.

The legs 25 of the supporting member carry at their upper end a split collar 80, the parts of which are secured and drawn together by means of the bolt 81. A cylindrical tube 82 is secured within the split collar 80, said tube being provided with an inner reinforcing tube 86 and a cross slot 87, in which a part of the bolt 81 is disposed, so as to prevent lateral shifting of said tube, relative to the collar 80. At the ends of said tube, there are provided tapering conical surfaces 83 and cylindrical surfaces 84, which face oppositely, and which are connected with the ends of the cylindrical tube 82, by means of the frustoconical surfaces 85, so that the carrier core comprises the cylindrical tube 82, the flange 85 at the end of said tube extending outwardly therefrom, the frusto-conical surfaces extending downwardly and outwardly from the edges of said portions 85, and the cylindrical portions 84 at the extreme ends of said core. Portions 84 and 83 are adapted to receive the outer hub shell of a demountable wheel with the cylindrical portion 106 of the hub shell engaging the cylindrical portion 84 and the tapered conical surface 107 engaging the tapered conical surface 83, as clearly shown in Figures I and III of the drawing. At the outer end of the carrier core, a disc 88 is provided, having a peripheral flange 89 secured to the inner surface of the outer end of said core and provided with a central flange 90, which is externally threaded to receive a nut 93. Secured to said nut is the disc 94, having an inwardly tapering flange 95, adapted to engage a portion of the hub shell mounted on said core so as to force it firmly into engagement therewith.

A casting 44 is suitably secured to the cross bar 14 at about the mid-point thereof, and is provided at its outer end with a cylindrical boss 45, to which is secured the cylindrical flange 46, formed at the center of a yieldable disc 47, which is provided with a peripheral flange 48, of a diameter suitable to receive the edge of the hub shell of the wheel carried by the support.

A locking bolt 96 has the inner end thereof threaded at 97 and screwed into a threaded opening in said cylindrical boss 45, and the outer end of said bolt is provided with a flange 98, forming a bearing therefor, within the flange 90. The outer end of said bolt is provided with a hex 99, by means of which the bolt may be turned, and has a stem 103 extending outwardly therefrom and through a central opening in the disc 100, which covers the end of the hub secured on said core, and which cover may be locked on said bolt by means of padlock 105. 108 represents the outer edge of the hub shell of the demountable wheel, which is of such a diameter that it engages the flange 48 of the disc 47, secured to the cylindrical boss 45, so that said disc forms a broad bearing surface for said hub shell and holds it firmly in position. The disc 100 is likewise of such diameter as to engage the edge of the outer hub shell, so that, when the demountable hubs are in position, they are completely enclosed and held firmly and rigidly so that there can be no rattle or vibration.

The brace rod 19 and rear cross bar 14 of the frame constitute supporting elements adapted to suitably support the swinging member in wheel carrying position.

In Figures V and VI I have shown the manner of securing the connecting cross bar 19 to the extensions 15. The extensions 15 are provided with a half round socket 109, integral therewith, and the ends of the cross rod 19 are provided with slots 110, in which the keys 111 are disposed, said keys projecting beyond the cross rod 19 and being engaged by the edges of the half round caps 112, which fit around the ends of the cross rod 19, and co-operate with the half round sockets 109, so that, when they are clamped thereto by the bolts 113, the cross rod is held in place securely and firmly and in such a manner that it cannot twist or turn.

From the description of the parts given above, the operation of my device should be very readily understood.

Figure I shows a pair of wire wheels locked in place on the carrier. If one wishes to remove the outer wheel the padlock 105 is released so that the cover 100 can be removed from the projecting end 103 of the locking bolt 96. Nut 93 is then unscrewed from the externally threaded flange 90, carrying with it the disc 94, and when this nut and disc has been removed, the outer hub shell can be slipped off of the end of the carrier core. In doing this, the inner wheel, or the one carried next to the body of the vehicle, is not disturbed in any manner.

When one wishes to remove the inner wheel, the locking bolt 96 can be disconnected from the cylindrical boss 45 by rotating the same by means of the hex 99, and the carrier can then be swung down to a position corresponding to that shown in Figure II, since the legs 25 of the carrier are pivotally mounted on the cross rod 19. When swung to this position, the wire wheel on the inner end of the carrier core can be removed without any further operation. When the carrier core is held in its normal position by means of the locking bolt 96, the outer edge 108 of the inner hub shell engages the peripheral flange 48 on the dished disc, so that the dished disc closes the outer end of the hub shell and forms a broad and yielding bearing surface therefor, so that the carrier can be firmly and rigidly held in position. Neither of the wheels can be removed without unlocking padlock 105, and either one of these wheels can be removed without disturbing the other wheel. Furthermore, this carrier affords a very strong and rigid support for demountable wheels, which are usually quite heavy, and one in which the parts are sightly in appearance.

This application is a division of our co-pending application, Serial Number 172,720, filed June 4, 1917.

We are aware that the particular embodiment of our invention which we have here shown, is highly desirable from many standpoints. But we are also aware that this embodiment may be varied considerably without departing from the spirit of our invention, and, therefore, we desire to claim our invention both broadly and specifically, as indicated by the appended claims.

Having thus described our invention, what we claim as new and desire to secure by Letters Patent is:

1. The combination with an automobile frame, comprising side bars and a cross bar; of a supporting member pivotally connected with said frame; a member secured to said cross bar and having a boss with a threaded opening therein; a yieldable disc secured to said boss and having a peripheral flange adapted to receive one end of a wheel hub; a hub-receiving member carried by said supporting member; and a bolt co-acting with said supporting member and threaded opening and disposed within said hub-receiving member, for rigidly connecting said supporting member to said cross bar, said yieldable disc having a flange arranged substantially perpendicular to said bolt.

2. The combination with an automobile frame of a carrier supported thereby, said carrier including a member pivoted to a portion of said frame, a hub receiving member carried by said first mentioned member, means for detachably connecting said supporting member to another portion of said frame, and yieldable means interposed between said frame and supporting member in line with said hub receiving member to absorb vibration when said member is secured to said frame.

3. The combination with an automobile frame, comprising side bars and a cross bar; of a supporting member pivotally mounted on said frame; a member secured to said cross bar and having a threaded opening therein; a disc carried by said member and having a peripheral flange; a tube carried by said supporting member and provided at each end with a hub-receiving member comprising an outer cylindrical portion and an inner tapering portion; a disc secured in the cylindrical portion of the outer hub-receiving member, and having a central sleeve externally threaded; a nut threaded on said sleeve and carrying a disc adapted to engage a hub to hold it on said outer hub-receiving member; a locking bolt in said tube, journaled in said sleeve and having an inner end screwed into the threaded opening on the cross bar member to hold the tube with the outer edge of the hub on said inner hub-receiving member in engagement with the flange of said disc; a disc mounted on the outer end of said rod and engaging the outer edge of the hub on the outer hub-receiving member, and a padlock with a shackle passing through an opening in said rod, outside of said disc.

4. The combination with an automobile frame, comprising side bars and a cross bar; of a supporting member pivotally mounted on said frame; a member secured to said cross bar and having a threaded opening therein; a disc carried by said member and having a peripheral flange; a tube carried by said supporting member and provided at each end with a hub-receiving member, comprising an outer cylindrical portion and an inner tapering portion; a disc secured in the cylindrical portion of the outer hub-receiving member, and having a central sleeve externally threaded; a nut threaded on said sleeve and carrying a disc adapted to engage a hub to hold it on said outer hub-receiving member; a locking bolt in said tube journaled in said sleeve and having an inner end screwed into the threaded opening in the cross bar member, to hold the tube with the outer edge of the hub, on said inner hub-receiving member, in engagement with the flange of said disc; and a disc mounted on the outer end of said rod and engaging the outer edge of the hub on the outer hub-receiving member.

5. The combination with an automobile frame, comprising side bars and a cross bar; of a supporting member pivotally mounted on said frame; a member secured to said cross bar and having a threaded opening therein; a disc carried by said member and having a peripheral flange; a tube carried by said supporting member and provided at each end with a hub-receiving member, comprising an outer cylindrical portion and an inner tapering portion; a disc secured in the cylindrical portion of the outer hub-receiving member, and having a central sleeve externally threaded; a nut threaded on said sleeve and carrying a disc adapted to engage a hub to hold it on said outer hub-receiving member; a locking bolt in said tube, journaled in said sleeve, and having an inner end screwed into the threaded opening on the cross bar member to hold the tube with the outer edge of the hub on said inner hub-receiving member, in engagement with the flange of said disc.

6. The combination with an automobile frame, comprising side bars and a cross bar; of a supporting member pivotally mounted on said frame; a member secured to said cross bar and having a threaded opening therein; a tube carried by said supporting member and provided at each end with a hub-receiving member, adapted to receive a demountable wheel hub; a disc secured in the outer hub-receiving member, and having a central sleeve externally threaded; a nut threaded on said sleeve and carrying a disc adapted to engage a hub to hold it on said hub-receiving member; and a locking bolt in said tube, journaled in said sleeve, and having an inner end screwed into the threaded opening on the cross bar member.

7. The combination with an automobile frame comprising side bars and a cross bar, of a supporting member pivotally mounted on said frame; a tube carried by said supporting member and provided at each end with a hub-receiving member, adapted to receive a demountable wheel hub; a disc secured to said outer hub-receiving member, and having a central sleeve externally threaded; a nut threaded on said sleeve and having a disc adapted to engage a hub to hold it on said outer hub-receiving member; and releasable means for connecting said tube to said cross bar.

8. The combination with an automobile frame, comprising side bars and a cross bar; of a supporting member pivotally mounted on said frame; a tube carried by said supporting member and provided at each end with a hub-receiving member, adapted to receive a demountable wheel hub; removable means for securing a wheel hub on said outer hub-receiving member; and releasable means independent of said removable means for rigidly connecting said tube to said cross bar.

9. A carrier including in combination a supporting member pivotally connected to the frame of an automobile, means for detachably securing the said member to said frame, and a pair of hub receiving members carried by said supporting member each adapted to receive a demountable wheel hub, said hub receiving members being arranged to permit one of said wheel hubs to be attached to and detached therefrom without disturbing the connection between said supporting member and said frame, and to permit the other wheel hub to be attached to and detached from the hub receiving member when said supporting member is released from said frame and swung about its pivotal support away from the automobile.

10. The combination with an automobile frame, of a supporting member mounted on said frame; a tube carried by said supporting member provided at each end thereof with a hub-receiving member adapted to receive a demountable wheel hub; releasable means for rigidly holding a wheel hub on the outer hub-receiving member and independent releasable connections between said tube and said frame.

11. The combination with an automobile frame of a carrier supported thereby, said carrier including a supporting member pivoted to a portion of said frame, a hub receiving member carried by said first mentioned member, means for releasably securing said supporting member to another portion of said frame, and a yieldable disc for absorbing vibration when said member is secured to said frame, said disk being arranged substantially perpendicular to the axis of said hub receiving member.

12. A carrier including in combination a supporting member adapted to be movably mounted on the frame of an automobile, means to independently support a plurality of wheel hubs on said member, detachable means for rigidly securing said member to the automobile frame, said carrier being constructed so as to permit a wheel to be attached and detached from one of said wheel hub receiving means when said carrier is rigidly attached to said frame, and to permit another wheel to be attached and detached from another of said supporting means when said means for connecting said carrier to said frame is detached.

13. The combination with an automobile frame comprising side bars and a cross-bar, of a supporting member pivotally mounted on said frame, a tube carried by said supporting member and provided at each end with a hub receiving member adapted to receive a demountable wheel hub, releasable means for rigidly connecting said tube to said cross-bar, and means independent of said releasable means for removably securing a wheel hub on said outer hub receiving member.

14. In an automobile, a pivot, an elongated supporting member mounted midway upon said pivot, a hub receiver on each projecting portion of said supporting member, independent means for securing one end of said supporting member to the automobile and for securing a wheel hub upon the other end, and a common means for preventing unauthorized actuation of either of said independent means.

In testimony whereof we affix our signatures.

EDWARD H. BELDEN.
HARRY E. RHOADS.